(12) United States Patent
Pohl et al.

(10) Patent No.: US 10,802,504 B2
(45) Date of Patent: Oct. 13, 2020

(54) AUTONOMOUS RESCUE LANE

(71) Applicant: Intel IP Corporation, Santa Clara, CA (US)

(72) Inventors: Daniel Pohl, Puchheim (DE); Rodrigo Aldana Lopez, Zapopan (MX); Leobardo Campos Macias, Guadalajara (MX); Rafael De La Guardia Gonzalez, Guadalajara (MX); David Gomez Gutierrez, Tlaquepaque (MX); Jose Parra Vilchis, Guadalajara (MX); Roman Schick, Fürstenfeldbruck (DE)

(73) Assignee: Intel IP Corporation, Santa Clara, CA (US)

( * ) Notice: Subject to any disclaimer, the term of this patent is extended or adjusted under 35 U.S.C. 154(b) by 317 days.

(21) Appl. No.: 15/875,705

(22) Filed: Jan. 19, 2018

(65) Prior Publication Data
US 2019/0049994 A1 Feb. 14, 2019

(51) Int. Cl.
| G05D 1/02 | (2020.01) |
| G08G 1/0967 | (2006.01) |
| B60W 40/02 | (2006.01) |
| G08G 1/16 | (2006.01) |
| G08G 1/0965 | (2006.01) |
| G06K 9/00 | (2006.01) |

(52) U.S. Cl.
CPC ........... *G05D 1/0289* (2013.01); *B60W 40/02* (2013.01); *G05D 1/0278* (2013.01); *G06K 9/00791* (2013.01); *G08G 1/0965* (2013.01); *G08G 1/09675* (2013.01); *G08G 1/096725* (2013.01); *G08G 1/096775* (2013.01); *G08G 1/096791* (2013.01); *G08G 1/166* (2013.01); *G05D 1/0257* (2013.01)

(58) Field of Classification Search
USPC ............................................. 701/2
See application file for complete search history.

(56) References Cited

U.S. PATENT DOCUMENTS

| 8,838,321 | B1* | 9/2014 | Ferguson | B60W 30/18009 |
| | | | | 701/23 |
| 10,089,876 | B1* | 10/2018 | Ramasamy | G08G 1/162 |
| 2012/0306664 | A1* | 12/2012 | Geter | G08G 1/166 |
| | | | | 340/903 |
| 2015/0198457 | A1* | 7/2015 | Nagy | G01C 21/3658 |
| | | | | 701/431 |
| 2015/0321698 | A1* | 11/2015 | Fuehrer | G08G 1/0965 |
| | | | | 701/41 |
| 2017/0276492 | A1* | 9/2017 | Ramasamy | G01C 21/34 |
| 2019/0049994 | A1* | 2/2019 | Pohl | B60W 40/02 |

OTHER PUBLICATIONS

Kong et al., "Kinematic and Dynamic Vehicle Models for Autonomous Driving Control Design," 2015 IEEE Intelligent Vehicles Symposium (IV), Jun. 28-Jul. 1, 2015, 6 pages, COEX, Seoul, Korea.

* cited by examiner

*Primary Examiner* — Tyler D Paige
(74) *Attorney, Agent, or Firm* — Schiff Hardin LLP

(57) ABSTRACT

In one example, notice of a priority vehicle is obtained. A first protective field is generated around a current vehicle and a second protective field is generated around the priority vehicle. A priority lane is created by moving the first protective field of the current vehicle away from the second protective field of the priority vehicle.

25 Claims, 17 Drawing Sheets

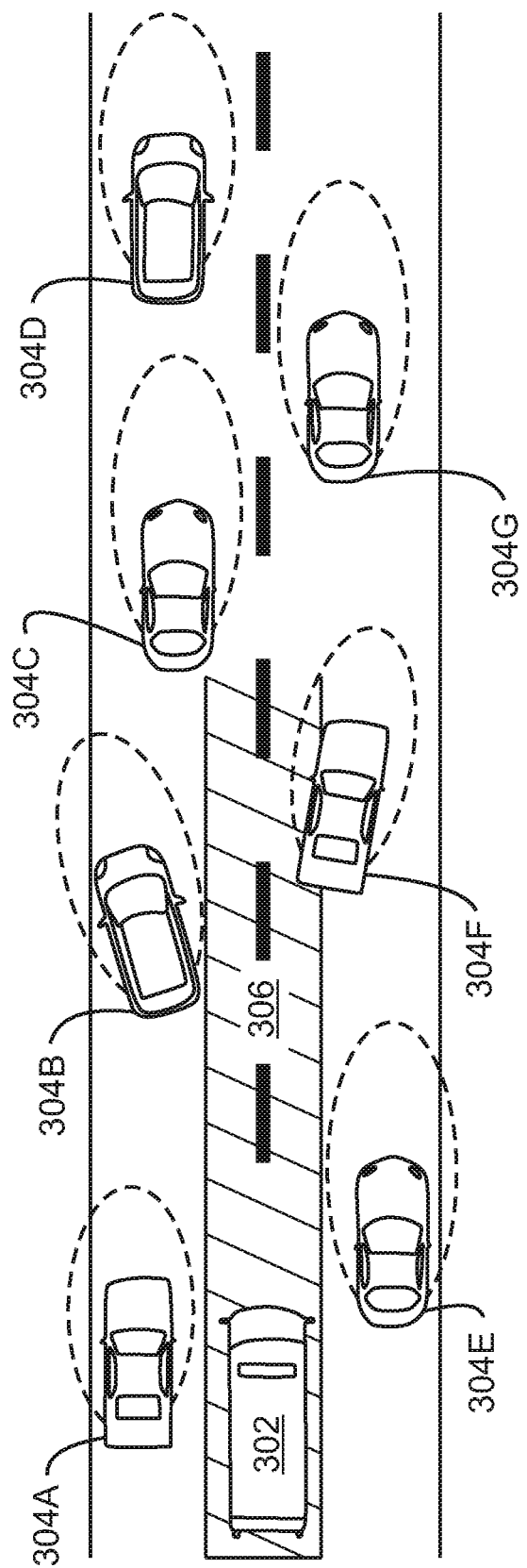

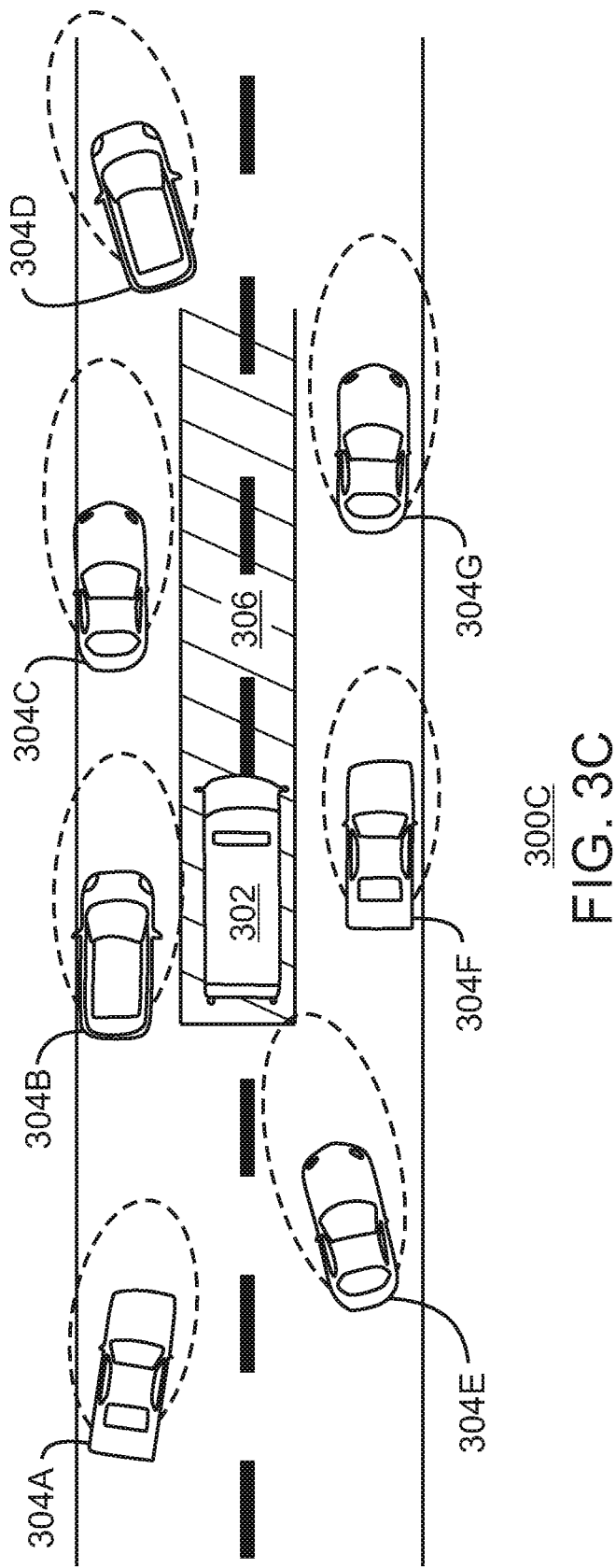

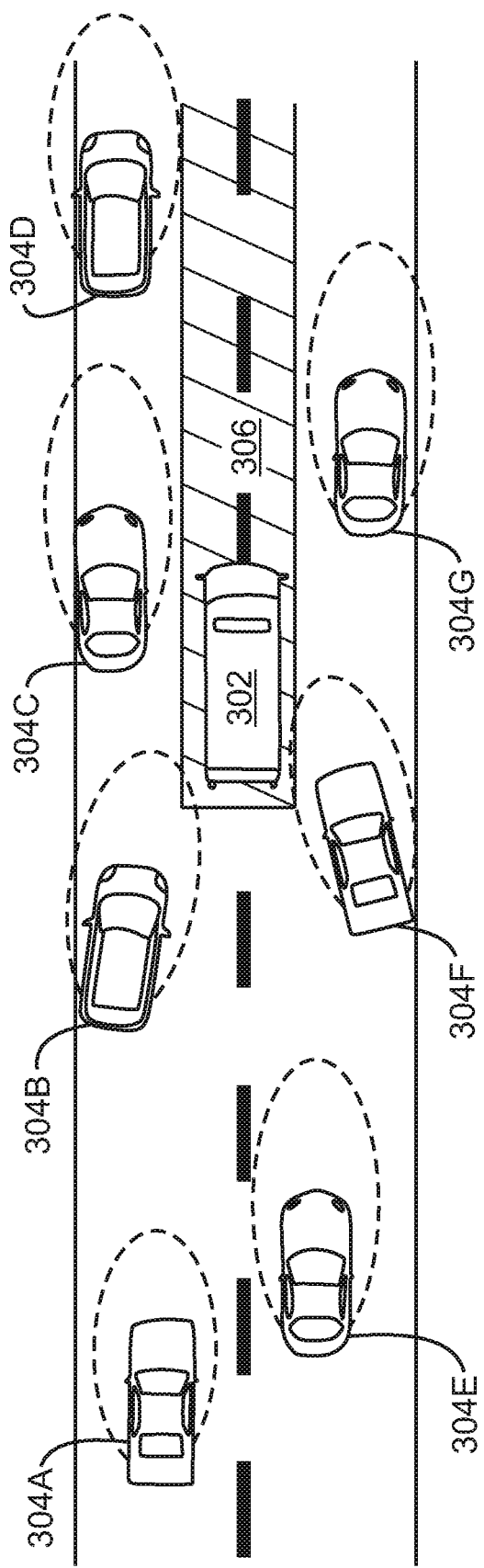

500A

500B

702

704

706

700

AUTONOMOUS RESCUE LANE

TECHNICAL FIELD

This disclosure relates generally to emergency lane notification and generation.

BACKGROUND

When accidents happen on high speed roads, the result is usually a traffic jam, as cars cannot pass by the accident at high speed or using the available number of lanes on roads. The traffic jam can have a negative impact on the time it takes emergency services the crash site.

BRIEF DESCRIPTION OF THE DRAWINGS

The following detailed description may be better understood by referencing the accompanying drawings, which contain specific examples of numerous features of the disclosed subject matter.

FIG. 3A is an illustration of autonomous rescue lane creation;
FIG. 3C is an illustration of autonomous rescue lane creation;
FIG. 3D is an illustration of autonomous rescue lane creation.

In some cases, the same numbers are used throughout the disclosure and the figures to reference like components and features. In some cases, numbers in the 100 series refer to features originally found in FIG. 1; numbers in the 200 series refer to features originally found in FIG. 2; and so on.

DESCRIPTION OF THE EMBODIMENTS

Figure 1:
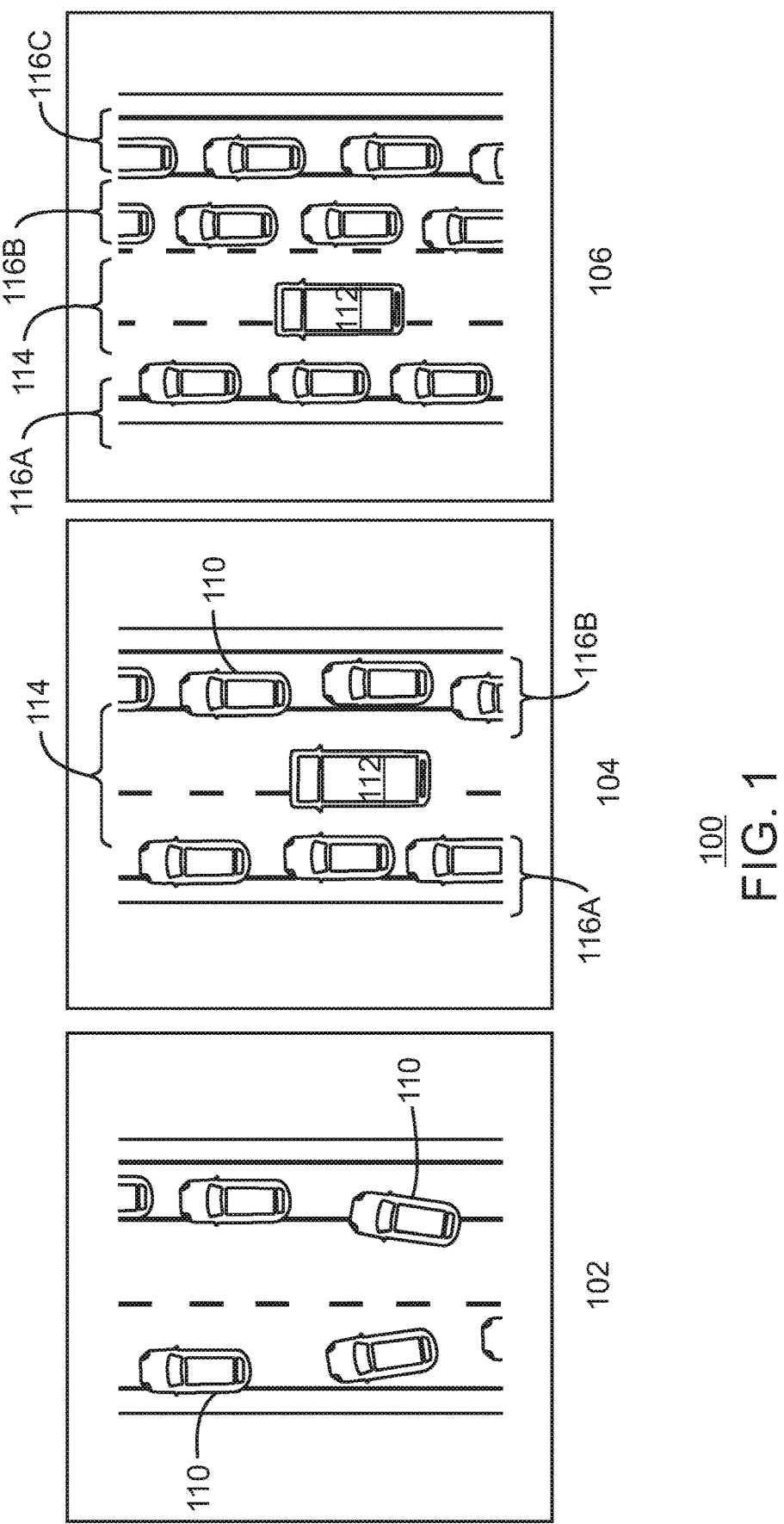
FIG. 1 is an illustration of the formation of a rescue lane.

It is often problematic for vehicles on a roadway to make way so that priority vehicles, such as ambulances, police vehicles, firefighter trucks, third party responder, or any government associated vehicle can reach their destination quickly. As used herein, priority vehicle may refer to any vehicle of an emergency service provider or emergency event responder. In embodiments, a designation as an emergency service provider or emergency event responder may be prescribed by law or generally recognized by a general population. Some countries or jurisdictions have defined specific protocols for emergency situations that all vehicles must follow. For example, in Germany there is a protocol called referred to as "Rettungsgasse," or rescue lane. This protocol states that whenever a priority vehicle approaches, drivers must steer to the sides of the roadway in order to create a new inner lane called the rescue lane. However, this solution is often confusing and difficult to implement. In practice, people are often not aware on how to build such an emergency lane or because of slowly moving traffic, assume that no emergency lane is required in that instance. This behavior leads to extreme traffic jams due to accidents, as emergency services are not able to pass through fast enough so that the first responders can dissolve the cause of the traffic jam and help survivors. Moreover, in some cases, drivers near an event or accident are unaware of when a priority vehicle will approach.

Embodiments described herein enable the creation of an autonomous rescue lane. In embodiments, the present techniques take advantage of the autonomous functionality of cars in order to create a rescue lane autonomously when a priority vehicle needs to pass. Moreover, priority vehicles may send their current position to a jurisdiction-wide or country-wide mapping service and to have this information integrated into current navigational systems that have access to online data updates.

Some embodiments relate to autonomous emergency lane routing. Some embodiments relate to safety based emergency routing. Some embodiments relate to autonomous emergency lane routing, leading to higher safety conditions for the driver and/or passengers of a vehicle and emergency responders. That is, some embodiments relate to safety and/or emergency lane routing. Some embodiments relate to Global Positioning System (GPS) routing.

As discussed above, navigation systems such as GPS (Global Position Satellite) systems can offer various tools for mapping and route planning. For example, autonomous emergency lane routing systems might provide routes for situations such as the shortest route for a plurality of cars to create an emergency lane. Many drivers might prefer obtaining automatic emergency lane creation based on a location of a priority vehicle. For example, drivers are often unaware of the exact location of an emergency lane or the rules surrounding emergency lane creation.

In some embodiments, a GPS, smart car, and/or other route planning device is used to enable autonomous emergency lane routing. In some embodiments, public databases can be accessed and data from the public databases can be used, for example, in addition to internal and/or external vehicle sensor measurements to generate an emergency route plan for a driver that optimizes an efficient emergency lane creation.

Some embodiments relate to a navigation system such as a navigation system on a computer, a phone, a car, etc. In some embodiments, in addition to available options such as suggesting the shortest or fastest emergency lane creation route, the navigation system identifies to the user the location of the emergency lane. The emergency lane creation can be implemented in response to many different data points, for example, including static public databases, dynamic public databases, internal and external sensor measurements, driving history data, driver visible emergency scenarios, etc.

FIG. 1 is an illustration 100 of the formation of a rescue lane. FIG. 1 includes three views 102, 104, and 106 of the formation of the rescue lane 114. At view 102, no clear rescue lane exists, however passenger cars 110 begin moving to the right or left to clear a passage for any priority vehicles. At view 104, a priority vehicle 112 traverses the rescue lane 114 which is created by two lanes 116A and 116B of passenger vehicles 110. At view 106, another roadway illustrates the priority vehicle 112 traversing the rescue lane 114 that is created by three lanes 116A, 116B, and 116C of passenger vehicles.

When the drivers hear or observe the approach of a priority vehicle, typically drivers from a far left lane steer to the left, while drivers from all other lanes steer to the right. This generates a rescue lane in a newly created middle lane, which is used by the priority vehicle. In some cases, a passenger vehicle may be forced to travel along a sand trip or shoulder of the main roadway lanes in order to provide enough room to create the rescue lane.

No matter the country, jurisdiction, or applicable traffic laws, the rules surrounding the rescue lane creation often generate confusion among drivers since not all drivers are fully aware of how to create a rescue lane. Moreover, even if drivers are aware of the applicable rules, many choose not to follow these rules. Further, many drivers are unaware that a priority vehicle is approaching and a rescue lane should be created. Even after the formation of a rescue lane, drivers forming the rescue lane may be obligated to stop, increasing traffic delays.

By taking advantage of inter-car communications, the sensors that come with autonomous cars, and the ability to alert drivers to accidents via navigation applications, the present techniques implement an algorithm that can be integrated in the navigation controller of passenger vehicles, on a smart phone, or other electronic device. In embodiments, the present techniques autonomously generate a rescue lane. As the emergency or priority vehicle has passed, the present techniques dissolve the rescue lane by allowing vehicles to safely and fluently return to their original lanes without requiring them to stop and eliminating any delay that results from human decision making. The algorithm also takes into account nearby obstacles such as cyclists, pedestrians or fences as long as they are detected by the car itself, either through its own sensors or via communication with road-side infrastructure or with other road users. The obstacles may also be detected by navigation applications. Additionally, the notification that an emergency lane or priority lane is necessary/needed may be obtained by the priority vehicles alerting a third party service to the position of the priority vehicles. As described herein, the terms emergency lane, rescue lane, or priority lane may be used interchangeably. The term priority lane describes a lane created for any event for which priority access to the event may be desired. A rescue lane describes an event where rescue by emergency or priority services or vehicles may be required. An alert or notification as to the position of the priority vehicles may be generated in the passenger vehicle. Additionally, the notification that an emergency lane is necessary/needed may be obtained directly from the priority vehicles.

Figure 2:
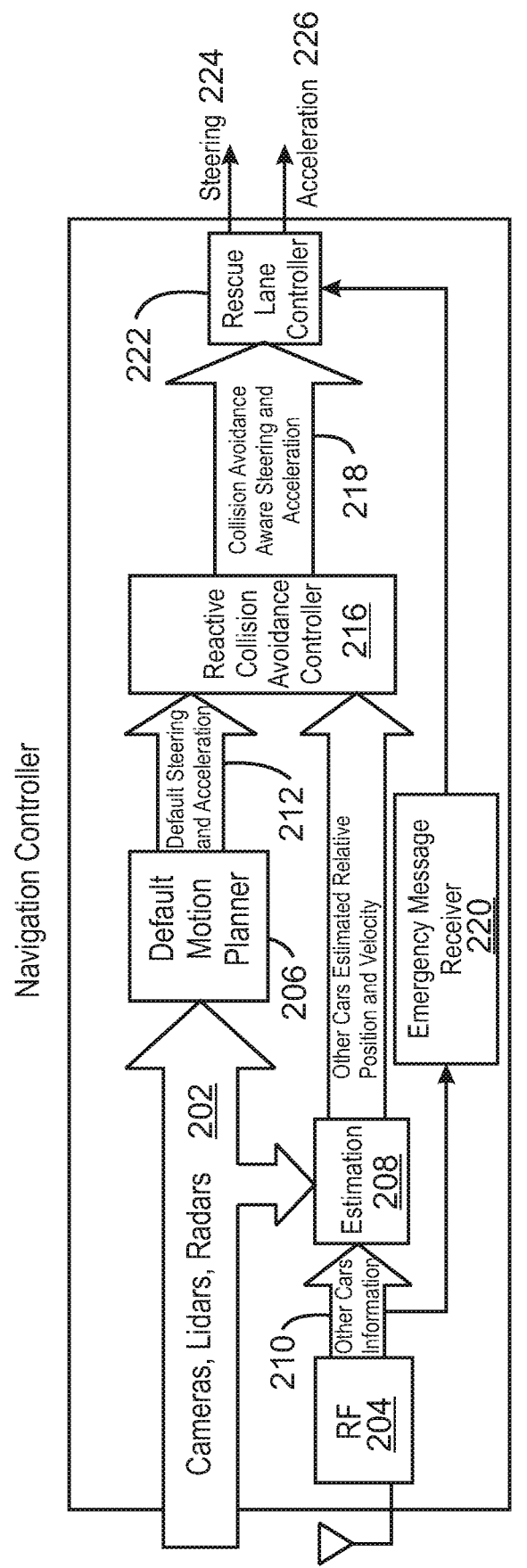
FIG. 2 is a block diagram of a controller for autonomous rescue lane creation.

FIG. 2 is a block diagram of a controller 200 for autonomous rescue lane creation. In embodiments, the controller is a component of the autonomous driving system of a passenger vehicle. The controller may also be located remotely from a vehicle, and can send instructions wirelessly to the vehicle for autonomous rescue lane creation. Inputs to the controller 200 are information captured by components of the vehicle such as a camera, Light Detection and Ranging (Lidar) mechanism, radar, and the like. The data generated by these components is illustrated by the arrow 202. In embodiments, this data may be obtained by a receiver of the controller 200. A radio frequency (RF) block 204 may be configured to transmit or receive data via an antenna. For example, the RF block 204 may capture other cars information as indicated by arrow 210. In embodiments, the other cars' information may include data from other cars' cameras, Lidars, radars, and any values derived from these data points.

The data captured by the camera, Lidar, radar, and the like at arrow 202 are input to a default motion planner 206. The default motion planner 206 is typically present in an autonomous vehicle system. The default motion planner 206 is responsible for general autonomous navigation of the vehicle. For example, the default motion planner may output steering and navigation values based on information collected from the environment by the camera, Lidar, radar, and so on as indicated by arrow 202.

The arrow 212 represents low level outputs such as the steering of the front wheels and acceleration that the motor must provide from the default motion planner 206. A plurality of sensor data as indicated at block 202 and other cars information such as the position of the other cars shared via RF signals as indicated by arrow 210 are used in a sensor fusion estimator 208. The estimator 208 is configured to estimate a relative position and velocity of other vehicles in the current vehicle's field of view as indicated by the arrow 214.

The reactive collision avoidance controller 216 may determine and track all possible sources of collision. The reactive collision avoidance controller 216 may generate a first protective field around a current vehicle and a second protective field around the priority vehicle. The arrow 218 illustrates the output of the reactive collision avoidance controller 216 as collision avoidance aware steering and acceleration. Specifically, the steering and acceleration values from the default motion planner 206 may be modified by the reactive collision avoidance controller 216 such that the modified steering and acceleration values avoid any possible collisions. Moreover, the reactive collision avoidance controller 216 may determine a protective field around the current vehicle. The protective field is a region of space around the current vehicle that should not be breached by any other vehicle.

A rescue lane controller 222 determines the location of a rescue lane based on the current steering and acceleration values from the reactive collision avoidance controller. The rescue lane controller may also obtain emergency information from an emergency message receiver 220. In embodiments, the emergency message receiver obtains a position and speed of a priority vehicle. The rescue lane controller may determine an estimated time of arrival of the priority vehicle. In embodiments, the rescue lane controller 222 modifies the steering and acceleration values based on the position and speed of the priority vehicle. Accordingly, the rescue lane controller 222 outputs a final steering value 224 and acceleration value 226 for the current vehicle.

FIG. 3A is an illustration of autonomous rescue lane creation. A reactive collision avoidance controller may work in parallel with an autonomous navigation controller of an autonomous vehicle. In FIG. 3A, a priority vehicle 302 traverses the roadway 300A among a plurality of road users 304A, 304B, 304C, 304D, 304E, 304F, and 304G. While a plurality of cars or passenger vehicles are illustrated as road users, a road user (RU) may include vehicles, cyclists, eighteen wheelers, cargo trucks, buses, surface level trains, and the like. Each road user generates a protective field via a reactive collision avoidance controller. Accordingly, while the vehicles may have varying levels of autonomous driving ability, each vehicle may include a reactive collision avoidance controller to generate a protective field and corresponding steering and acceleration values to create an autonomous rescue lane.

In FIG. 3A, the protective field around each road user is illustrated with a dashed line. The field is shaped differently depending on the type of vehicle and the speed of vehicle. Generally, the protective field extends outward from the road user in its primary direction of motion. In the case of priority vehicles, the size and shape of their protective fields is extended to allow for more aggressive driving even in dense traffic situations. The protective field for the priority vehicle 302 is illustrated using solid lines creating the rescue lane 306. In embodiments, autonomous vehicles detect the protective fields of other RUs and are repelled by them so they naturally move away from emergency and other priority road users even in congested traffic scenarios. In this manner, each vehicle will behave normally unless a priority vehicle approaches. Cars will move to create space on the roadway for the rescue lane, and when the priority vehicle is sufficiently far the cars will tend to go back to their original state on the road as they follow their planned route.

Figure 3B:
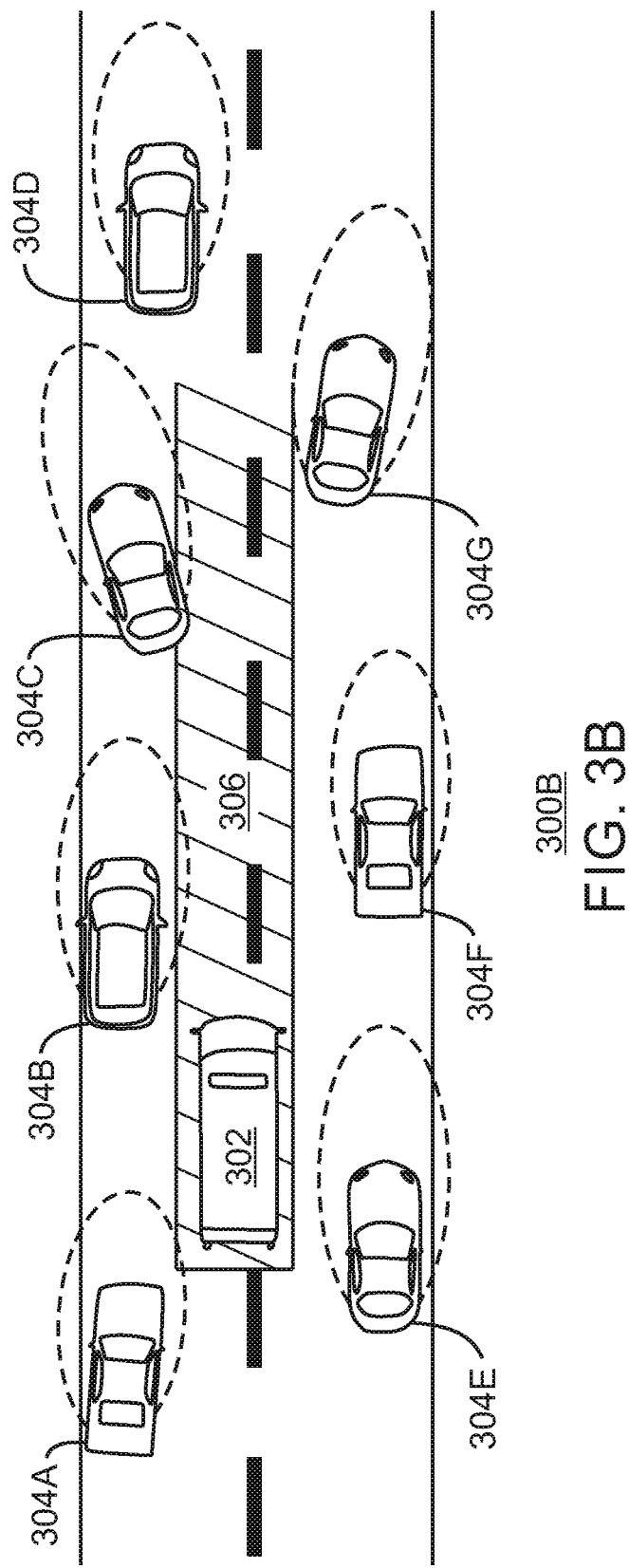
FIG. 3B is an illustration of autonomous rescue lane creation.

FIG. 3B is an illustration of autonomous rescue lane creation. As illustrated in FIG. 3A, the priority vehicle 302 traverses the roadway 300B, obligating the plurality of road users 304A, 304B, 304C, 304D, 304E, 304F, and 304G to steer away from the virtual, autonomous rescue lane 306. As used herein, the autonomous rescue lane refers to a section of a roadway that is cleared to accommodate efficient access to collisions, incidents, and other emergency situations by a priority vehicle. In FIG. 3B, the plurality of road users 304A, 304B, 304C, 304D, 304E, 304F, and 304G outside of the rescue lane have moved to create the rescue lane, but are still moving forward. In embodiments, the plurality of road users 304A, 304B, 304C, 304D, 304E, 304F, and 304G autonomously create the rescue lane 306 and remain moving forward at or near their original rate of speed once the rescue lane has formed. In this manner, a rescue lane is created with the smallest amount of delay available to road users creating the rescue lane. Moreover, the autonomous creation of the rescue lane removes any doubt regarding the location or proper techniques to be used to generate the rescue lane.

FIG. 3C is an illustration of autonomous rescue lane creation. As the priority vehicle 302 moves along the roadway 300C, passenger vehicles 304A and 304B that have been passed by the priority vehicle 302 begin to steer to reincorporate to their original state along the roadway 300D as indicated by the direction of their respective protective fields. Similarly, FIG. 3D is an illustration of autonomous rescue lane creation. In FIG. 3D, passenger vehicles 304A and 304B have completely regained their original position along roadway 300D. The passenger vehicles 304E and 304F begin to steer to reincorporate their original position along the roadway 300D as indicated by the direction of their respective protective fields. In this manner, as the priority vehicle 302 traverses the roadway, the vehicles behind the rescue lane autonomously steer to regain their original position. FIGS. 3A-3D illustrate virtual forces surrounding each passenger vehicle as well as the protective field generate to form the rescue lane. In embodiments, the protective fields and rescue lane are placed in order to avoid collisions while forming the rescue lane.

Figure 4A:
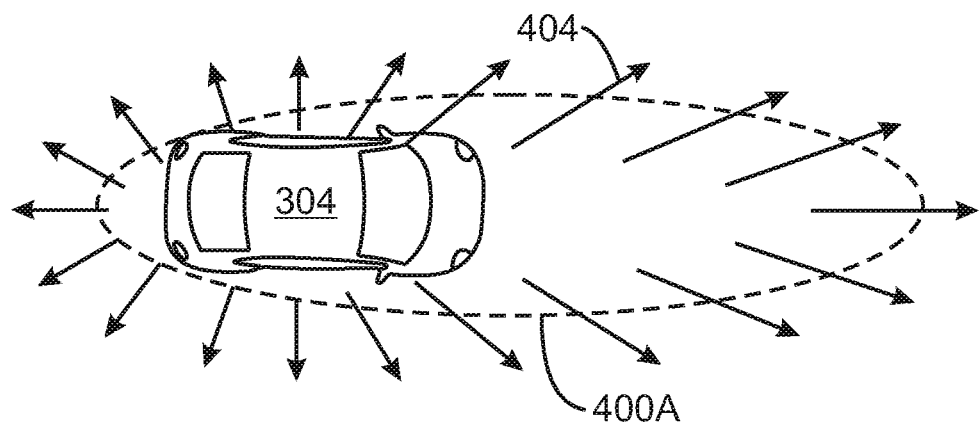
FIG. 4A is an illustration of a protective field surrounding a road user.

FIG. 4A is an illustration of a protective field 400A surrounding a road user 304. In FIG. 4A, the road user is illustrated as a car. As discussed above, the shape of the virtual forces and resulting protective field depend on the velocity or the passenger vehicle 304 as well as the shape and size of the passenger vehicle 304. The arrows 404 illustrate the virtual forces generated by the passenger vehicle 304. In embodiments, the virtual forces are used to generate the protective field surrounding the road user 304.

Figure 4B:
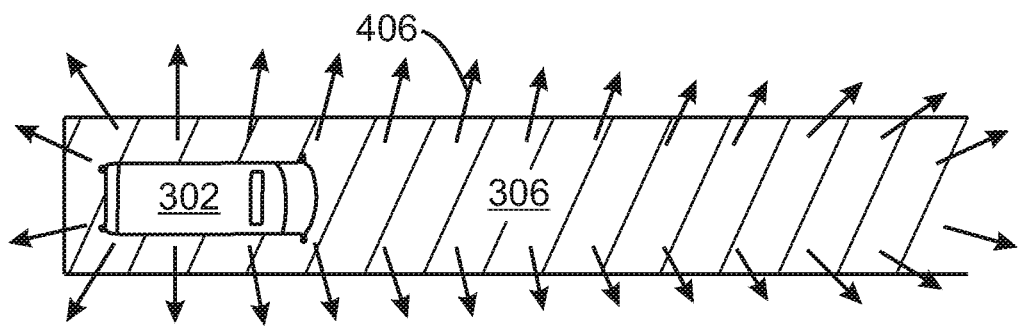
FIG. 4B is an illustration of a rescue lane 306 for a priority vehicle.

FIG. 4B is an illustration of a rescue lane 306 for a priority vehicle 302. In embodiments, the rescue lane 306 is a protective field assigned to the priority vehicle 302. Arrows 406 illustrate the virtual forces generated by the priority vehicle 302. The virtual forces generated by the priority vehicle 302 are generated in the form of a large rectangle along the roadway forming the rescue lane 306. The length of the lane is configured to prevent accidents from unexpected situations such as the appearance of a pedestrian, object, or road user within the emergency lane. In embodiments, the length of the emergency lane may be directly proportional to a speed of the priority vehicle. In other embodiments, the length of the emergency lane may be a predetermined length based on a speed of the priority vehicle.

The virtual forces used to create the protective field are based on the speed of the current vehicle as well as information regarding other passenger vehicles and priority vehicles. In order for an individual car to generate the corresponding virtual forces that will be used to generate the protective field, various values may be obtained from other vehicles, or the values may be estimated. In embodiments, the relative position of other vehicles, the velocity of the other vehicles, the position of the approaching priority vehicles, and the velocity of the approaching priority vehicles are used to generate the virtual forces used to create that vehicles protective field.

In embodiments, the relative position of other vehicles and the velocity of the other vehicles can be obtained via inter-car communication (e.g. the cars communicate their own positions and speeds) combined with the information from lidars/radars/cameras equipped in the car itself. The position of the approaching priority vehicles and the velocity of the approaching priority vehicles may be obtained via basic safety messages broadcasted by the emergency vehicle and/or road side infrastructure. The broadcast of messages can be accomplished as described below. Velocity measurements from all vehicles are also estimated by differentiating the received positions, thus, the most essential information needed for the algorithm is the position of cars and the position of priority vehicles.

Figure 5A:
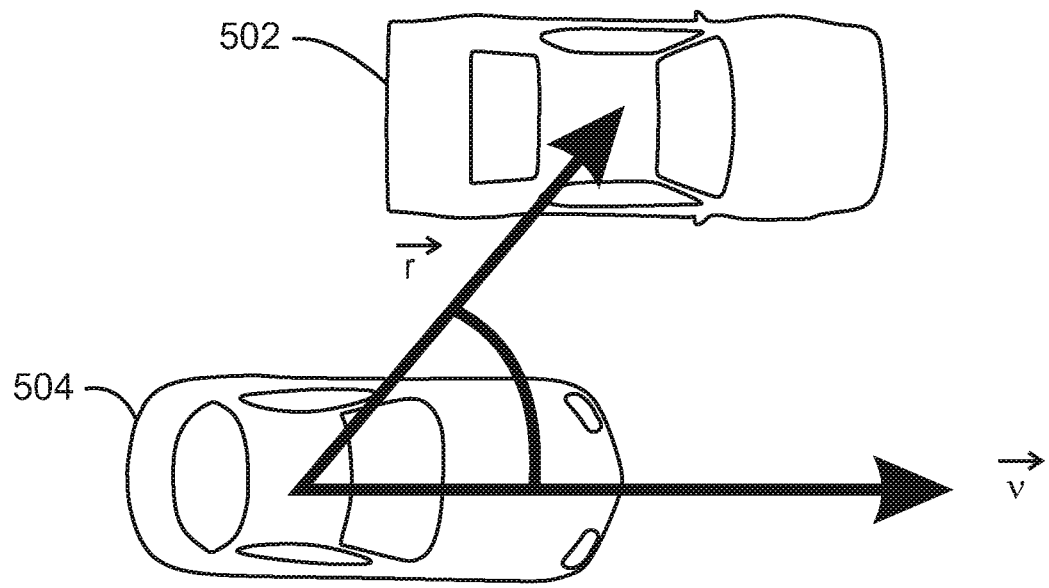
FIG. 5A is an illustration of the virtual force sensed by car due to another car.

FIG. 5A is an illustration of the virtual force sensed by car 502 due to car 504. In embodiments, the reactive collision avoidance controller 216 (FIG. 2) may calculate the virtual forces. Specifically, the virtual force sensed by the car 502 due to the car 504 is calculated by taking the relative position of the car 504 with respect to the car 502, its relative velocity (0 m/s if both cars are moving at the same speed) and then calculating the following:

$$\vec{F}_{virtual} = \exp(-\lambda \vec{v} \cdot \vec{r}) \frac{\vec{r}}{\|\vec{r}\|^2} \quad (1)$$

where $\vec{F}_{virtual}$ is the virtual force vector generated by some car or obstacle, $\vec{r}$ is the distance vector between the car generating the force and another point of interest were the force is taken into account (e.g. another car), and λ is a design parameter which changes how reactive are the forces with respect to the relative velocity vector $\vec{v}$ of the car (with respect to the point where the force is being taken into account, e.g. another car) and could have a default value of 1, but for a higher value a more reactive effect is obtained. In embodiments, FIG. 5A is an example of $\vec{r}$ and $\vec{v}$.

Figure 5B:
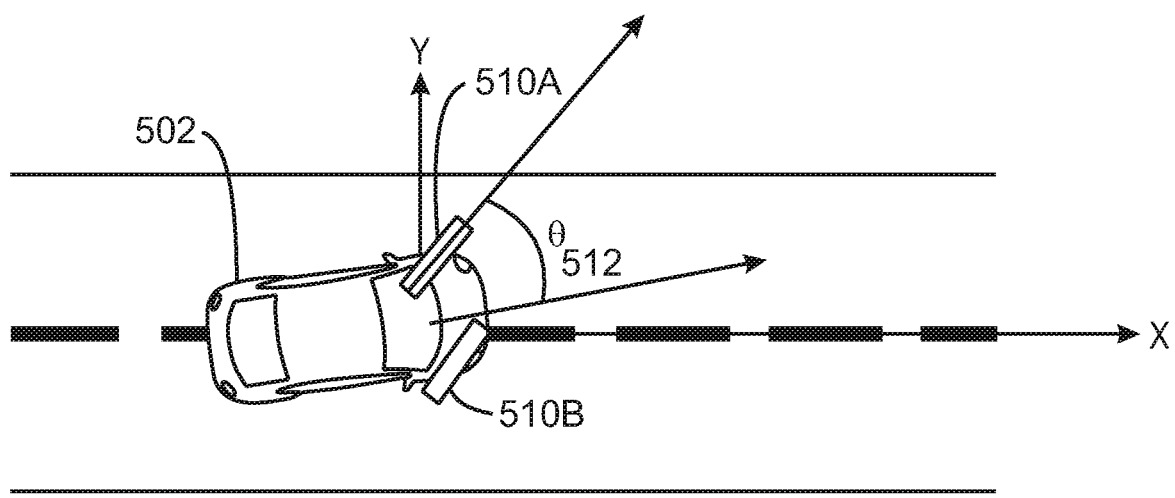
FIG. 5B is an illustration of the virtual force sensed by car due to another car.

The formula in Eqn. (1) generates behaviors like the one depicted in FIG. 5B. FIG. 5B is an illustration of force components. In FIG. 5B, the components of the force will act on the x- and y-axis aligned with the road as shown in FIG. 5B. A component of the force in the y-axis means that the car needs to move in that axis, and it can only do that by steering. A component in the x-axis means that the car needs to be pushed in that axis, by means of accelerating. Thus, FIG. 5B illustrates the axis convention and the definition of the steering angle where the above described motion would be applied.

In embodiments, the virtual force $\vec{F}_{virtual}$ may be described as a vector of two components $F_x$ and $F_y$. From this, steering and acceleration are calculated as $$\text{Steering} = k_s F_y$$

$$\text{Acceleration} = F_x \quad (2)$$

where the steering is the desired angle θ 512 of the wheels 510A and 510B to the front of the car. The constant $k_s$ acts as a sensitivity parameter since the acceleration and steering do not share the same units. In embodiments, the sensitivity parameter $k_s$ may be used to covert the steering value to the same units as the acceleration value. For a higher $k_s$, a higher reactive effect occurs along the y axis. In embodiments, a higher value of $k_s$ leads to more aggressive maneuvers. This same virtual force field $\vec{F}_{virtual}$ can be generated for other detected but non cooperative obstacles such as pedestrians. In embodiments, the virtual force is generated in the same way for pedestrians as long as the relative position $\vec{r}$ of the pedestrian with respect to the car and its relative velocity $\vec{v}$ is measured. The forces generated equally by all cars, rescue lane and pedestrians are added at the end to generate a total force. The cars calculate locally the total force as sum of the individual forces generated by all the things they can perceive, and then readjust their steering and acceleration.

Figure 6:
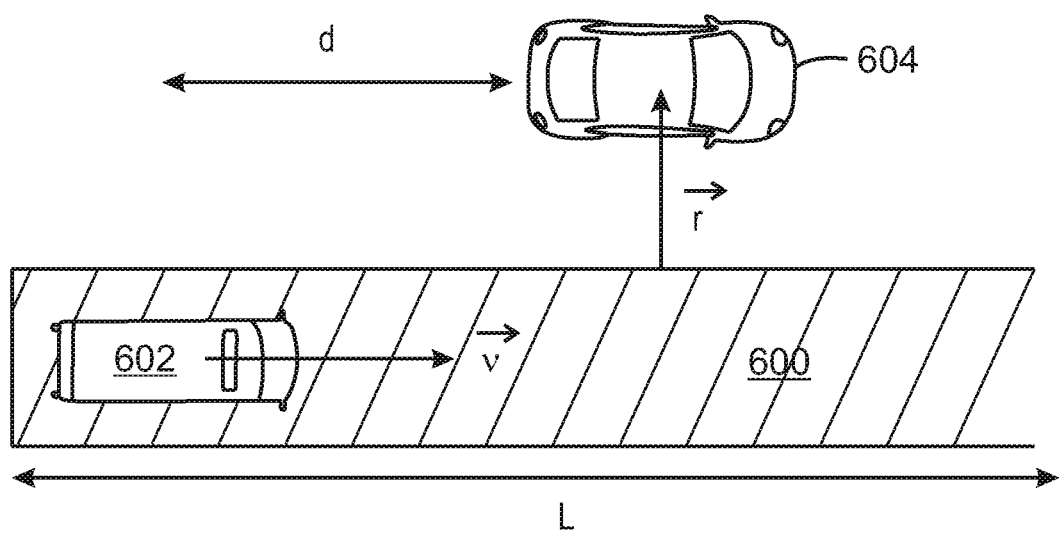
FIG. 6 is an illustration of a rescue lane determination.

FIG. 6 is an illustration of a rescue lane 600 determination. In embodiments, the rescue lane controller has components similar to the reactive collision avoidance controller. In embodiments, the rescue lane controller may generate the same virtual force field but the relative position and velocity are extended to create the rescue lane.

With regard to FIG. 6, the relative position vector r is a smallest vector from the car 604 to a nearest point on the rescue lane 600. This relative position vector r can be calculated by taking the received emergency vehicle position (since the emergency vehicle is broadcasting it or it is received from a third party broadcast) and moving it a distance d towards the car only if d<L. The distance d may be the relative distance between the car and the priority vehicle, and L is the length of the rescue lane. In embodiments, for a larger L the cars will react sooner (the lane will be created before the priority vehicle gets near the cars), and L may be selected to compensate for the traffic density.

The velocity v of the priority vehicle can be estimated using several samples of the priority vehicle position. These calculations may be used to generate virtual force fields for the priority vehicle similar to the ones in FIG. 4B. The steering and acceleration for the priority vehicle are extracted from this in the same way as in equation (2). In embodiments, the steering and acceleration are calculated as in the equation (2). In the case of the emergency lane, the force generated by the emergency lane may be calculated locally, and the steering and acceleration may be recalculated in response to the local calculations. The steering and acceleration of the combined forces are the same as in equation (2), but $F_x$ and $F_y$ are X and Y components of the total force. In embodiments, the final steering and acceleration are the combined sum of the forces, reactive collision avoidance and rescue lane output. By superposing the default acceleration, the cars will generate the rescue lane without stopping.

Figure 7:
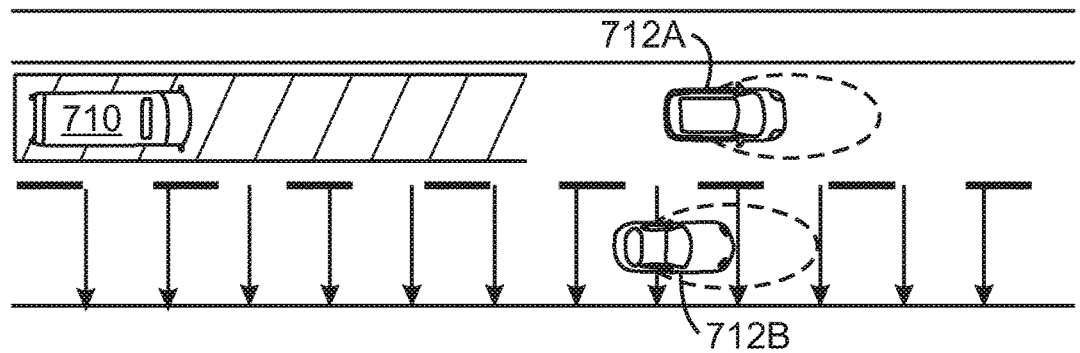
FIG. 7 is an illustration of the creation of a rescue lane with limited space.
Figure 7:
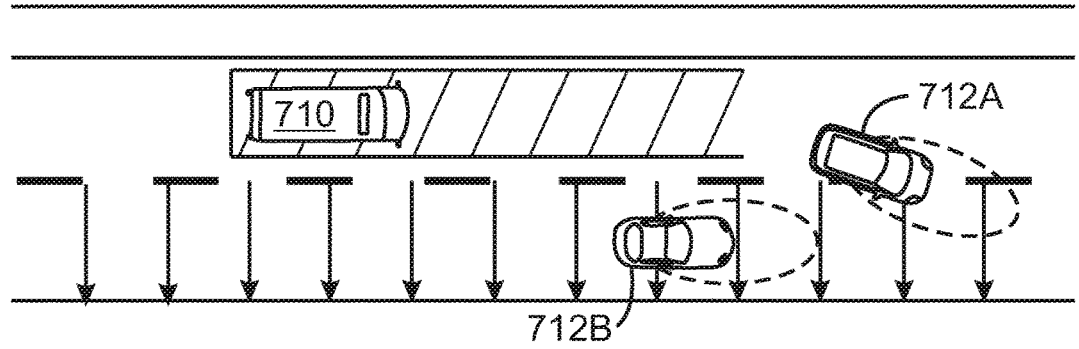
Figure 7:
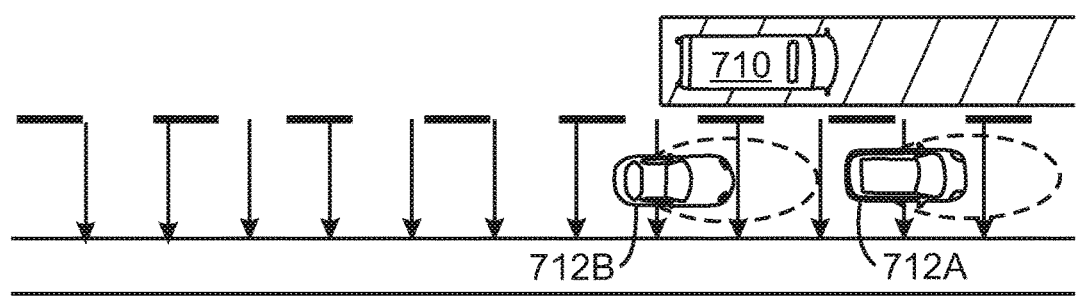

Even though the present techniques may be used for streets with enough space to form the rescue lane, there may be other scenarios in which the rescue lane may not be created due to lack of space. For those cases, the rescue lane may be created as follows. FIG. 7 is an illustration of the creation of a rescue lane with limited space. In such a scenario, the emergency vehicle must travel along a particular lane of the roadway. In the example of FIG. 7, the emergency lane is generated along the left-most lane of the street. The virtual forces may be calculated for the priority vehicle 710 and other vehicles 712A and 712B as described above. For the vehicles 712A and 712B in the right lanes, a virtual force along the separation between the left-most lane and the other lanes is placed when the emergency vehicle is near. In this manner, cars in the left-most lane are obligated to move to the right lanes.

In simulations using a bicycle dynamic model for the car, and the present techniques have resulted in collision free navigation of the priority vehicle across the traffic and collision free motion of the cars, and generating the rescue lane without the need to stop. In embodiments, a bicycle dynamic model utilizes a linear tire model to describe the wheel/ground interaction. Additionally, in embodiments, emergency services can send their current position to a country-wide mapping service and to have this information integrated into current navigational systems that have access to online data updates.

In embodiments, a navigation application may provide routing information of priority vehicles to a user. Thus, even in older cars with no autonomous driving functionality, a navigation application may be used to coordinate the formation of the emergency lane. Thus, the autonomous lane formation as described above may be displayed to a user via a navigation application. In some embodiments, an autonomous lane generation system may be related to and/or implemented partially or completely in one or more of a GPS navigation system, a vehicle, a smart vehicle, a smart car, a phone, a tablet, a mobile device, a laptop computer, and/or a desktop computer, etc.

Figure 8:
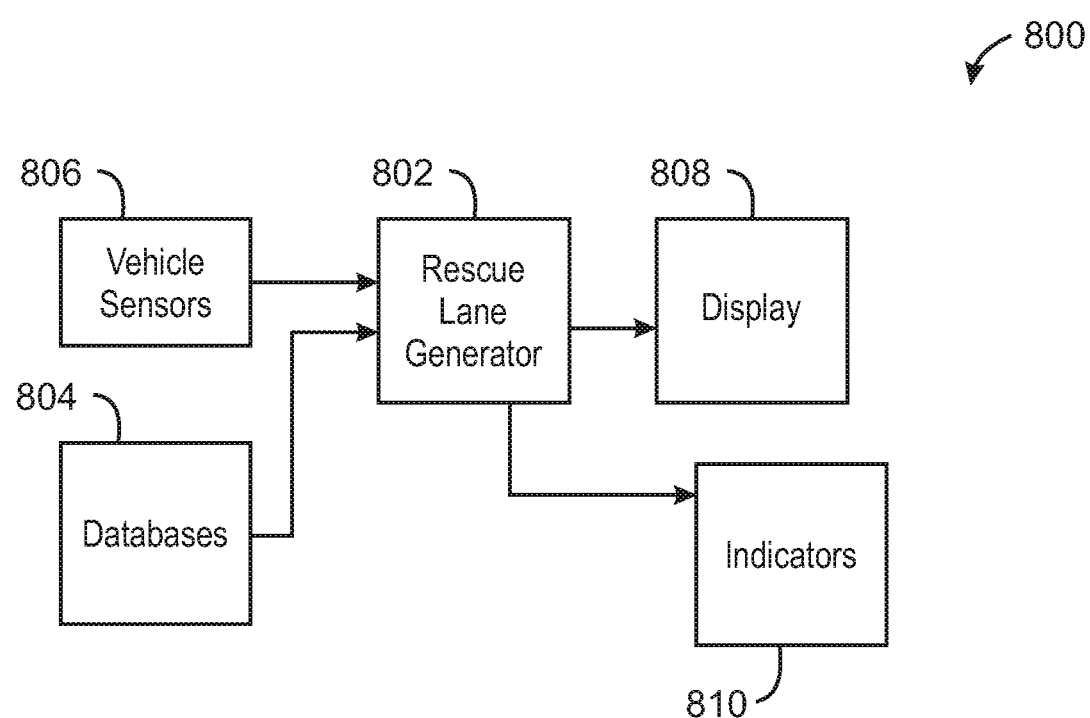
FIG. 8 illustrates a safety based and/or autonomous lane routing generation system.

FIG. 8 illustrates a safety based and/or autonomous lane routing generation system 800. In some embodiments, safety and/or autonomous lane routing generation system 800 is related to and/or implemented partially or completely in one or more of a GPS navigation system, a vehicle, a smart vehicle, a smart car, a phone, a tablet, a mobile device, a laptop computer, and/or a desktop computer, etc. System 800 includes a rescue lane generator 802, one or more database(s) 804, one or more vehicle sensors 806, a display 808, and indicators 810. In some embodiments, the one or more of rescue lane generator 802 can be implemented using one or more processors.

Rescue lane generator 802 collects and aggregates data from multiple sources, including, for example, the database (s) 804 and vehicle sensors 806. The collected data can include, for example, the location of road hazards and priority vehicles within a particular distance from a current location (for example, priority vehicles that may be active in the event of a collision, medical emergency, or road hazard). In some embodiments, a GPS (Global Positioning System), smart car, and/or route planning tool is used to access databases 804 in order to generate an autonomous rescue lane route plan for a driver that optimizes the rescue lane formation in concert with other vehicles on the roadway.

The databases 804 can include, for example, a database accessible by emergency service providers and/or priority vehicles. In some embodiments, the databases 804 can be updated by the emergency service providers and/or the priority vehicles, and can include information such as a location of priority vehicles. In some embodiments, the databases 804 are connected on the fly (for example, via cloud connection). The databases 804 may also include a speed, direction, and other information regarding the priority vehicles. In some embodiments, the database is a private, secure database. For example, the database 804 may be stored on a government controlled server. When an event requiring emergency services occurs, information stored in the database 804 can be pushed to an autonomous lane routing generation system of a vehicle or an electronic device. For example, an emergency message receiver 220 (FIG. 2) may be configured to receive a position and location of the priority vehicles from the database 804. The navigation controller 200 can use this information to facilitate autonomous rescue lane creation. Additionally, a navigation application of an electronic can use this information to generate an autonomous rescue lane route plan and display the plan to a user.

Vehicle sensors 806 can include various sensors on, in, or near the vehicle, the driver, and/or other vehicle occupants. These sources could include smartphone, camera, wearable, and/or other types of vehicle and/or personal sensors. The rescue lane generator can then generate plan for forming the rescue lane, and provide the plan to a display 808. The display 808 may generate a map with visual instructions and indicators of the rescue lane. In embodiments, the display 808 provides instructions regarding how to build the rescue lane, when to build the rescue lane, where to build the rescue lane, and why the rescue lane is required.

For example, instructions may indicate that a rescue lane should be created in the center of a two lane road by moving to the right shoulder of the roadway. The display 808 may provide a time period or countdown regarding when to move to the right shoulder of the roadway to build the rescue lane. Additionally, the display 808 may provide details on why the rescue lane is needed by informing the driver of the type of accident or event that has occurred. For example, the display may indicate a two car accident, a medical emergency, or debris on the roadway. In this manner, traffic jams associated with accidents and road hazards may be reduced, as each driver has the latest information and has been informed of exactly how to enable quick and efficient passage of priority and/or priority vehicles through the formation of the rescue lane. While the present techniques have described building a rescue lane via visual instructions and alerts presented on a display, any instruction or alert described herein may also be delivered through audio signals from the rescue lane generator. Moreover, LED lighting inside the car may be dedicated to rescue lane guidance.

Accordingly, a plurality of indicators 810 may illuminate within the vehicle or externally on the vehicle to give visual clues to drivers regarding the right direction to steer in order to build the emergency lane. As discussed above, an indicator within a vehicle may be dedicated to rescue lane guidance and can provide instructions and information to a driver. The indicators 810 within a vehicle may be located on a heads up display, a rear view mirror, steering wheel, or any other location within view of a driver. Indicators 810 may also be located externally on a vehicle. For example, indicators at the rear of the vehicle can be used to show drivers the right direction to build the rescue lane.

In some embodiments, rescue lane generator 802, display 808, and indicators 810 may be implemented using one or more processors. In some embodiments, those devices (and/or one or more processor) are implemented at the vehicle location. In some embodiments, those devices (and/or one or more processor) are implemented at the cloud. In some embodiments, devices of FIG. 8 may be local (for example, at the vehicle or an electronic device within the vehicle). In some embodiments, devices of FIG. 8 may be remote (for example, at the cloud). In some embodiments, some or all processing implemented in system 800 can be implemented locally (for example, at the vehicle or an electronic device within the vehicle). In some embodiments, some or all processing implemented in system 800 can be implemented remotely (for example, in the cloud). For example, the rescue lane plan may be generated remotely, and the plan may be sent to the vehicle or an electronic device within the vehicle for display.

Figure 9:
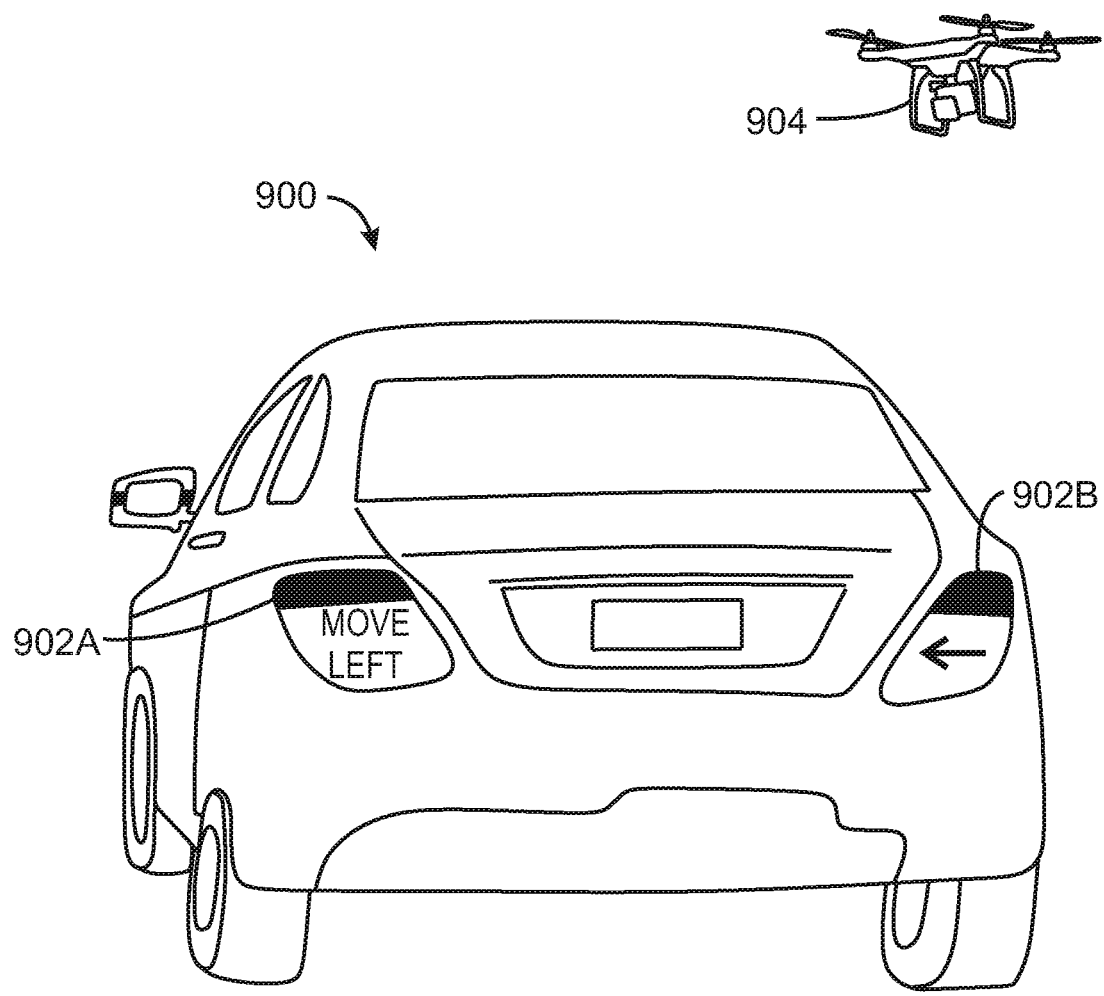
FIG. 9 is a rear view of a car.

FIG. 9 is a rear view of a car 900. The car 900 includes indicator lights 902A and 902B. The indicator lights 902A and 902B illustrate a correct direction for a particular scenario to build the rescue lane. As discussed above, notifications that a priority vehicle is approaching can be obtained from the priority vehicle itself, a third party, or navigation software. For example, emergency services may promote their position to mapping services.

With the information that a priority vehicle is approaching, the car 900 uses its internal sensors, navigation controller, auto pilot functionality, or any other driving assistance to determine which lane it is on, (e.g. center lane in a three lane road), and gives instruction in the cockpit, in a display, or a heads up display (HUD) to the driver or passengers of the vehicle, regarding the correct direction to drive to build an emergency lane. Further, through sensors like the blind spot sensor, the car can give guidance on how much more the car can drive into a recommended direction to increase the width of the emergency lane.

Indicators 902A and 902B at the back of the car show a correct direction for the example of FIG. 9 to build the emergency lane to others outside of the car 900. In embodiments, the indicator lights may be used to display text or symbols. Thus, since the current car 900 can obtain instructions regarding the formation of the rescue lane, the information can be shared with surrounding vehicles that may not have the technology or ability to obtain this information. This enables giving the warning of soon incoming priority vehicles to older cars without much technology inside them.

As illustrated, indicator 902A includes the text MOVE LEFT atop what is traditionally considered a brake light. Similarly, indicator 902B includes an arrow symbol atop what is normally considered a brake light. While particular lights have been described, the present techniques can be used to display text and symbols via any light on or within the car 900. For example, a new light may be positioned on the rear of car 900 and used exclusively to alert drivers to the correct procedure to build an emergency lane. Thus, the position, location, and type of light is used for exemplary purposes. Moreover, the correct emergency lane formation is at least partially dependent on the particular country or jurisdiction of travel, the type of vehicle, and the size of the roadway.

In FIG. 9, a drone 904 flies above the car 900. In embodiments, the drone in front of the emergency vehicle warns of the incoming priority vehicle. In some cases, for cars without updated communication technologies, the best way to warn them is with other technology not related to the capabilities of their vehicle. For example, a drone 904 flying 300 meters in front of the priority vehicle can have visual and audible sounds like a police siren and can easily pass over the cars that are still blocking the road instead of building an emergency lane. As the distance to the accident site is typically not an extreme distance, traveling to the accident or event site by drone may be easily doable with one battery charge of a drone. For longer distances, a second or third drone could be used.

The rescue lane generation enables the generation of an emergency lane without relying on more vehicle to vehicle communication. In embodiments, priority vehicles including emergency services like police, ambulance, fire fighters may optionally disclose their current position of their vehicles into an online service. However, in some cases some priority vehicles may choose not to disclose their location. For example, in the case of a fleeing criminal, the police might choose to not disclose their exact position of vehicles trying to catch the criminal.

Figure 10:
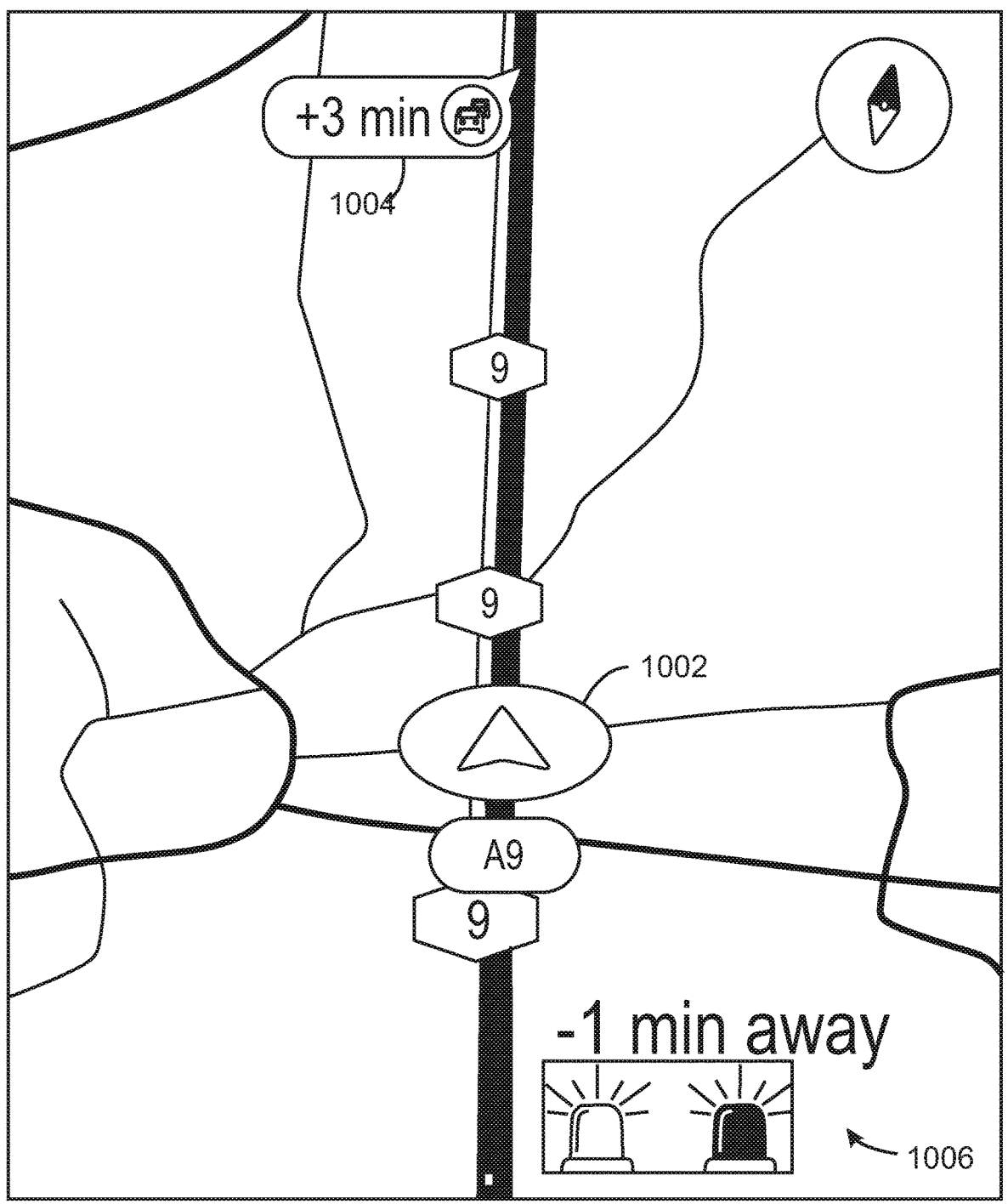
FIG. 10 is an illustration of a display.

FIG. 10 is an illustration of a display 1000. The display 1000 may be a display of a vehicle or a HUD of a vehicle. The display 1000 may also be a display of an electronic device located in or near the vehicle. On the display 1000, the location 1002 of the current vehicle is displayed. A message 1004 may indicate an estimated time of arrival to the location of the accident. In embodiments, the message 1004 may also include further instruction according to the rescue lane generation plan. For example, the message 1004 may instruct a driver to "Create a Rescue Lane by Steering Left," "Maintain Rescue Lane for 1000 feet," or "Resume Normal Lane." Further another message 1006 may indicate an estimated time of arrival of a priority vehicle. For example, the message 1006 indicates to a user that the priority vehicle is approximately one minute from the location of the accident. Accordingly, the present techniques provide notification of a soon incoming priority vehicle trying to pass through traffic. Through this notification, accident victims and those in need of emergency assistance are provided with the critical and fast help they need.

In embodiments, the priority or priority vehicles can disclose their position, and traditional navigational map systems can use this information to warn users of a priority vehicle closing up to their position. In embodiments, a government controlled server may be used so that emergency services can upload their current position. Navigation route providers can obtain read access to such as database, or the database can be used to push information to navigational tool vendors when an accident occurs.

Figure 11:
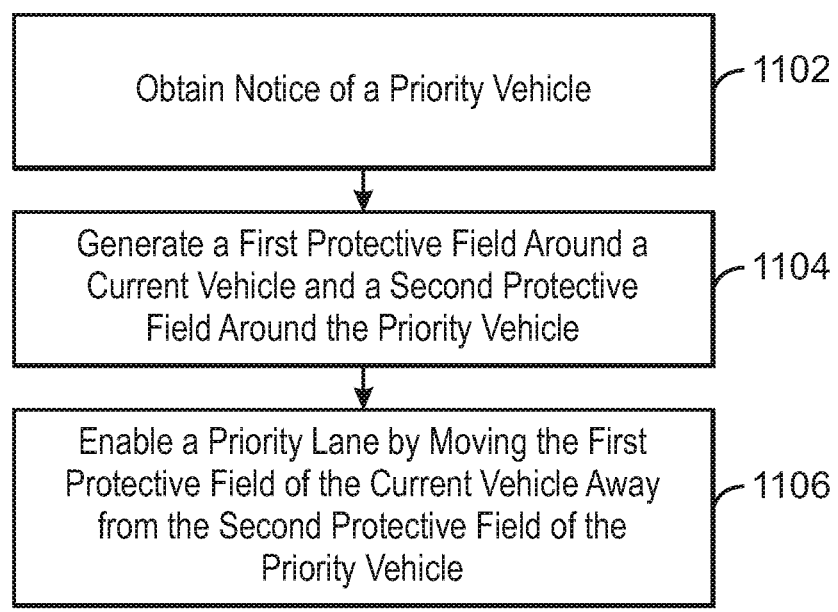
FIG. 11 is a process flow diagram of a method for autonomous emergency lane creation.

FIG. 11 is a process flow diagram of a method 1100 for autonomous emergency lane creation. At block 1102, notice of an approaching priority vehicle is obtained. In embodiments, the notification may be sent directly from the priority vehicle to a navigation system of a vehicle or electronic device. At block 1104, a protective field is generated around a current vehicle, and a second protective field is generated around the priority vehicle. At block 1106, a priority lane is created by moving the first protective field of the current vehicle away from a second protective field of the priority vehicle.

In this manner, the present techniques create a dynamic "rescue lane" in an autonomous fashion without generating a full stop of involved vehicles. This allows a unique synergy between emergency and normal vehicles: emergency and priority vehicles are able to navigate fast through dense traffic while normal vehicles are delayed as little as possible.

Figure 12:
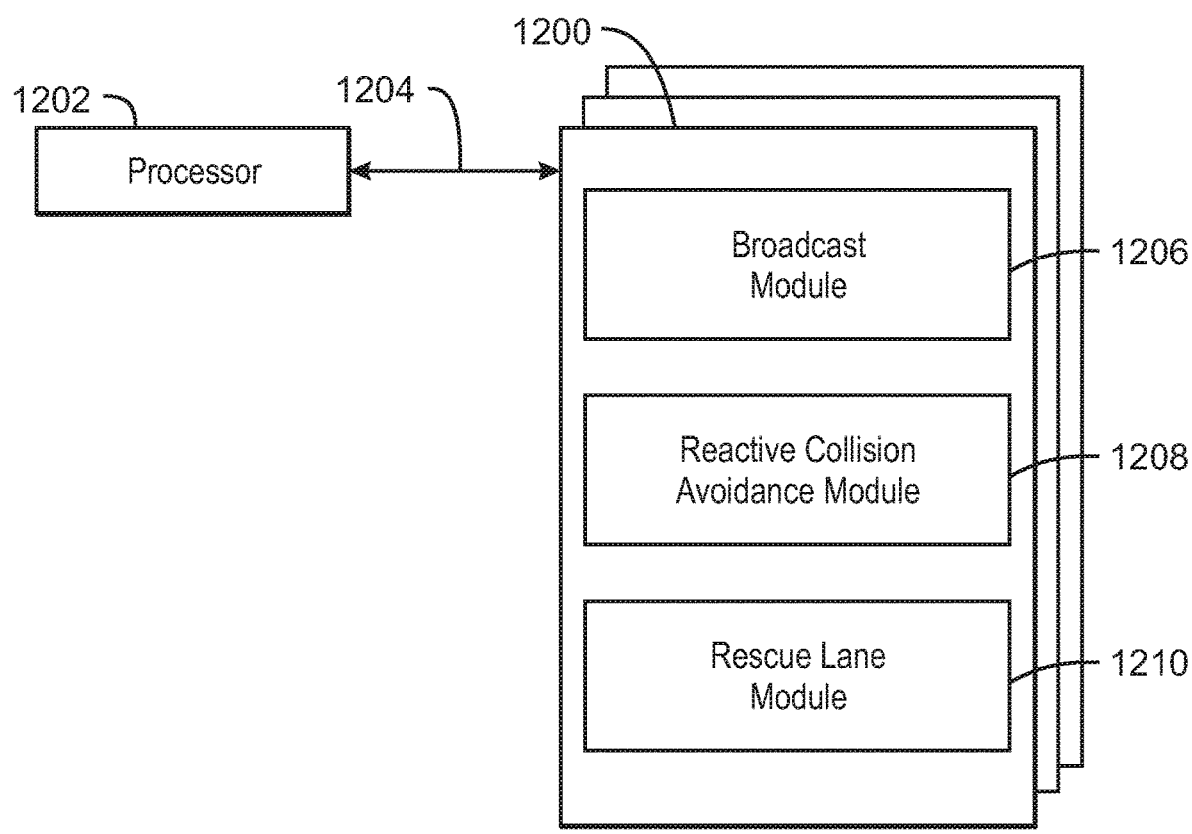
FIG. 12 is a block diagram of an example of a processor and one or more tangible, non-transitory computer readable media for autonomous lane creation.

FIG. 12 is a block diagram of an example of a processor and one or more tangible, non-transitory computer readable media for autonomous lane creation. The one or more tangible, non-transitory, computer-readable media 1200 may be accessed by the processor 1202 over a computer interconnect 1204. Furthermore, the one or more tangible, non-transitory, computer-readable media 1200 may include code to direct the processor 1202 to perform operations as described herein. In some embodiments, processor 1202 is one or more processors or controllers. In some embodiments, processor 1202 can perform similarly to (and/or the same as) controllers of FIG. 2, and can perform some or all of the same functions as can be performed by.

Various components discussed in this specification may be implemented using software components. These software components may be stored on the one or more tangible, non-transitory, computer-readable media 1200, as indicated in FIG. 12. For example, a broadcast module 1206 (for example, navigation routing instructions) may be configured to direct the processor 1202 to perform one or more of any of the operations described in this specification and/or in reference to FIGS. 1-11 and 13. For example, the broadcast module 1206 can be adapted to direct processor 1202 to broadcast rescue lane generation plan, or display that plan to a user. A reactive avoidance collision module 1208 may be configured to may determine a protective field around a current vehicle and a priority vehicle. A rescue lane module 1210 may be configured to autonomous generate a rescue lane or a rescue lane plan. In embodiments, the rescue lane module 1210 may generate steering and acceleration values to implement at a vehicle for generation of the rescue lane.

It is to be understood that any suitable number of the software components shown in FIG. 12 may be included within the one or more tangible, non-transitory computer-readable media 1200. Furthermore, any number of additional software components not shown in FIG. 12 may be included within the one or more tangible, non-transitory, computer-readable media 1200, depending on the specific application.

Figure 13:
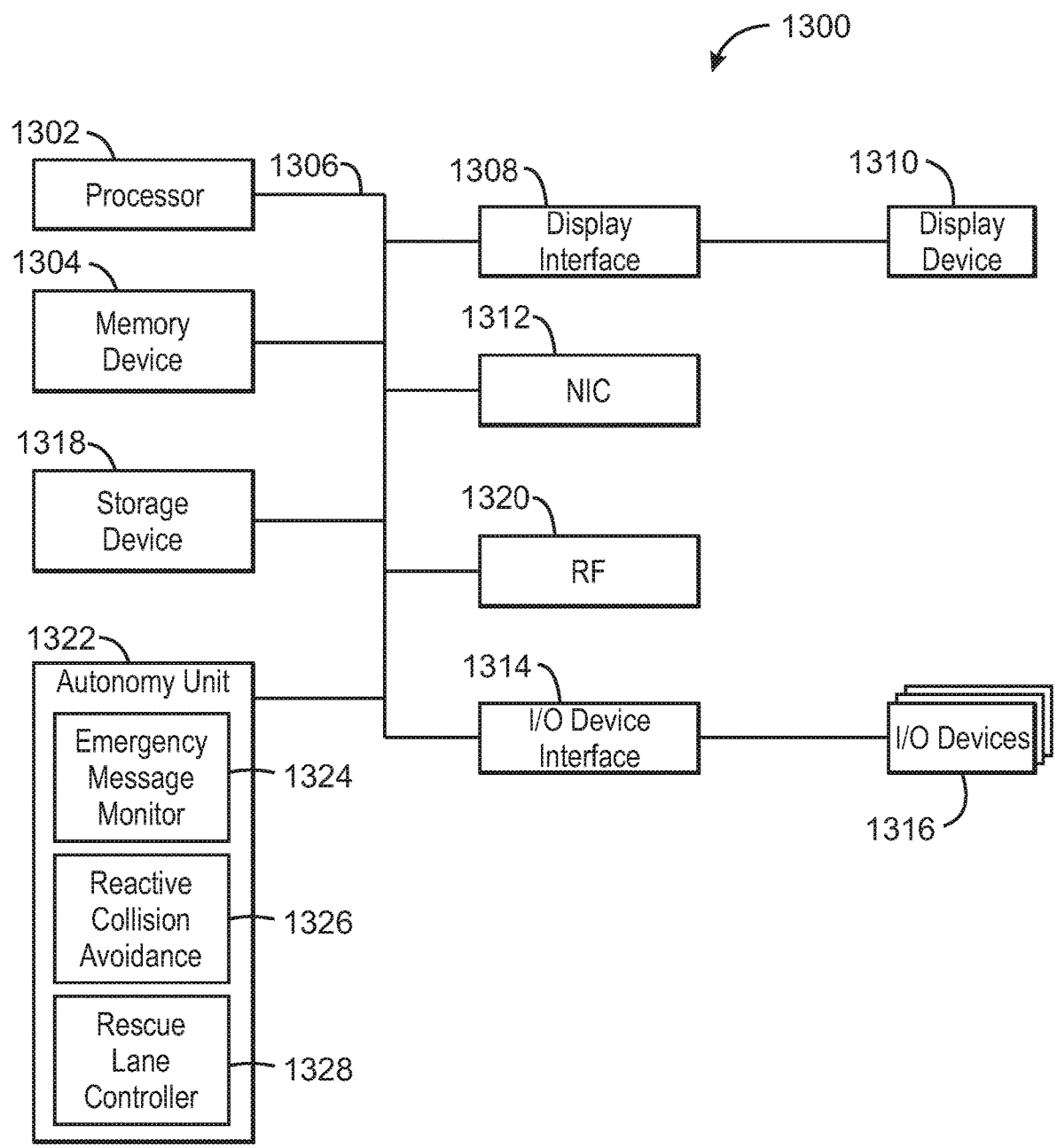
FIG. 13 is a block diagram of an example of a computing device that can implement autonomous lane creation.

FIG. 13 is a block diagram of an example of a computing device 1300 that can implement autonomous lane creation. In some embodiments, computing device 1300 is a navigation device (for example, a GPS device). In some embodiments, computing device can be included in a vehicle (for example, in an automobile). In some embodiments, any portion of the displays, methods, and/or systems illustrated in any one or more of FIGS. 1-12, and any of the embodiments described herein can be included in and/or be implemented by computing device 1300. The computing device 1300 may be, for example, a navigation device, a GPS device, a mobile phone, mobile device, handset, laptop computer, desktop computer, or tablet computer, among others. The computing device 1300 may include a processor 1302 that is adapted to execute stored instructions, as well as a memory device 1304 (and/or storage device 1304) that stores instructions that are executable by the processor 1302. The processor 1302 can be a single core processor, a multi-core processor, a computing cluster, or any number of other configurations. For example, processor 1302 can be an Intel® processor such as an Intel® Celeron, Pentium, Core, Core i3, Core i5, or Core i7 processor. In some embodiments, processor 1302 can be an Intel® x86 based processor. In some embodiments, processor 1302 can be an ARM based processor. The memory device 1304 can be a memory device and/or a storage device, and can include volatile storage, non-volatile storage, random access memory, read only memory, flash memory, or any other suitable memory or storage systems. The instructions that are executed by the processor 1302 may also be used to implement navigation routing as described in this specification.

The processor 1302 may also be linked through the system interconnect 1306 (e.g., PCI®, PCI-Express®, NuBus, etc.) to a display interface 1308 adapted to connect the computing device 1300 to a display device 1310. The display device 1310 may include a display screen that is a built-in component of the computing device 1300. The display device 1310 may also include a computer monitor, television, or projector, among others, that is externally connected to the computing device 1300. The display device 1310 can include light emitting diodes (LEDs), organic light emitting diodes (OLEDs), and/or micro-LEDs (μLEDs), among others.

In some embodiments, the display interface 1308 can include any suitable graphics processing unit, transmitter, port, physical interconnect, and the like. In some examples, the display interface 1308 can implement any suitable protocol for transmitting data to the display device 1310. For example, the display interface 1308 can transmit data using a high-definition multimedia interface (HDMI) protocol, a DisplayPort protocol, or some other wired or wireless protocol or communication link, and the like In addition, one or more network interface controllers (also referred to herein as a NIC) 1312 may be adapted to connect the computing device 1300 through the system interconnect 1306 to one or more networks or devices (not depicted). The network (not depicted) may be a cellular network, a radio network, a wide area network (WAN), a local area network (LAN), or the Internet, among others. In some embodiments, one or more NIC 1312 can include a wireless device to connect to a GPS network, and/or to one or more satellites (for example, one or more GPS satellites).

The processor 1302 may be connected through system interconnect 1306 to an input/output (I/O) device interface 1314 adapted to connect the computing host device 1300 to one or more I/O devices 1316. The I/O devices 1316 may include, for example, a keyboard and/or a pointing device, where the pointing device may include a touchpad or a touchscreen, among others. The I/O devices 1316 may be built-in components of the computing device 1300, or may be devices that are externally connected to the computing device 1300.

In some embodiments, the processor 1302 may also be linked through the system interconnect 1306 to a storage device 1318 that can include a hard drive, a solid state drive (SSD), a magnetic drive, an optical drive, a USB flash drive, an array of drives, or any other type of storage, including combinations thereof. In some embodiments, the storage device 1318 can include any suitable applications. In some embodiments, the storage device 1318 can include a basic input/output system (BIOS).

The computing device 1300 may also include an RF block 1320. In embodiments, the RF block 1320 enables vehicle to vehicle communication. Additionally, the RF block 1320 may include a transmitter and/or receiver. Moreover, the computing device 1300 may include an autonomy unit 1322. The autonomy unit 1322 may include an emergency message monitor 1324, a reactive collision avoidance controller 1326, and a rescue lane controller 1328. The emergency message monitor 1324 may receive information from priority vehicles and/or databases regarding a location, speed, and direction of the priority vehicles. The collision avoidance controller 1326 may generate virtual forces to establish protective fields around road users. A rescue lane controller 1328 may be configured to determine a location and position of a rescue lane.

It is to be understood that the block diagram of FIG. 13 is not intended to indicate that the computing device 1300 is to include all of the components shown in FIG. 13. Rather, the computing device 1300 can include fewer or additional components not illustrated in FIG. 13 (e.g., additional memory components, embedded controllers, additional modules, additional network interfaces, etc.) In some embodiments, databases and/or storage devices described herein (for example, databases 804) can be coupled within computing device 1300 (for example, as a storage device such as storage device 1318, and/or can be connected to computing device 1300, for example, using NIC 1312). In some embodiments, sensors such as vehicle sensors 806) can be coupled to the computing device 1300 (for example, as one or more I/O devices 1316). In some embodiments, sensors such as, for example, one or more rain sensors, vehicle sensors, cameras, audio sensors, steering wheel sensors, etc. can be included in computing device 1300 (for example, as one or more I/O devices 1316).

Example 1 is a system. The system includes a memory that is to store instructions; and a processor communicatively coupled to the memory, wherein when the processor is to execute the instructions, the processor is to: obtain notice of a priority vehicle; generate a first protective field around a current vehicle and a second protective field around the priority vehicle; create a priority lane by moving the first protective field of the current vehicle away from the second protective field of the priority vehicle.

Example 2 includes the system of example 1, including or excluding optional features. In this example, the notice of the priority vehicle is broadcast by a third party.

Example 3 includes the system of any one of examples 1 to 2, including or excluding optional features. In this example, the notice of the priority vehicle is provided by a drone.

Example 4 includes the system of any one of examples 1 to 3, including or excluding optional features. In this example, instructions for generating the priority lane are provided by indicator lights of the current vehicle.

Example 5 includes the system of any one of examples 1 to 4, including or excluding optional features. In this example, a reactive collision avoidance controller is to determine and track all possible sources of collision and to avoid the sources of collision in the first protective field and the second protective field.

Example 6 includes the system of any one of examples 1 to 5, including or excluding optional features. In this example, the first protective field is based, at least partially, on a speed and velocity of the current vehicle.

Example 7 includes the system of any one of examples 1 to 6, including or excluding optional features. In this example, the first protective field is based, at least partially, on a speed and velocity of a plurality of other vehicles.

Example 8 includes the system of any one of examples 1 to 7, including or excluding optional features. In this example, the first protective field is based, at least partially, on a position and velocity of the priority vehicle.

Example 9 includes the system of any one of examples 1 to 8, including or excluding optional features. In this example, a rescue lane controller determines the location of the priority lane based on the current steering and acceleration values.

Example 10 includes the system of any one of examples 1 to 9, including or excluding optional features. In this example, the notice of the priority vehicle is obtained from a remote database.

Example 11 includes the system of any one of examples 1 to 10, including or excluding optional features. In this example, the priority lane is a section of a roadway that is cleared to accommodate efficient access to locations where assistance is requested.

Example 12 includes the system of any one of examples 1 to 11, including or excluding optional features. In this example, the priority lane is created autonomously.

Example 13 is an apparatus. The apparatus includes an emergency message receiver to obtain notice of a priority vehicle; a reactive collision avoidance controller to generate a first protective field around a current vehicle and a second protective field around the priority vehicle; and a rescue lane controller to enable a priority lane by moving the first protective field of the current vehicle away from the second protective field of the priority vehicle.

Example 14 includes the apparatus of example 13, including or excluding optional features. In this example, the notice of the priority vehicle is broadcast by a third party.

Example 15 includes the apparatus of any one of examples 13 to 14, including or excluding optional features. In this example, the reactive collision avoidance controller is to determine and track all possible sources of collision and to avoid the sources of collision in the first protective field and the second protective field.

Example 16 includes the apparatus of any one of examples 13 to 15, including or excluding optional features. In this example, the first protective field is based, at least partially, on a speed and velocity of the current vehicle.

Example 17 includes the apparatus of any one of examples 13 to 16, including or excluding optional features. In this example, the first protective field is based, at least partially, on a speed and velocity of a plurality of other vehicles.

Example 18 includes the apparatus of any one of examples 13 to 17, including or excluding optional features. In this example, the first protective field is based, at least partially, on a position and velocity of the priority vehicle.

Example 19 includes the apparatus of any one of examples 13 to 18, including or excluding optional features. In this example, a rescue lane controller determines the location of the priority lane based on the current steering and acceleration values.

Example 20 includes the apparatus of any one of examples 13 to 19, including or excluding optional features. In this example, the notice of the priority vehicle is obtained from a remote database.

Example 21 includes the apparatus of any one of examples 13 to 20, including or excluding optional features. In this example, the priority lane is a section of a roadway that is cleared to accommodate efficient access to locations where assistance is requested.

Example 22 includes the apparatus of any one of examples 13 to 21, including or excluding optional features. In this example, the priority lane is created autonomously.

Example 23 is a method. The method includes obtaining notice of a priority vehicle; generating a first protective field around a current vehicle and a second protective field around the priority vehicle; creating a priority lane by moving the first protective field of the current vehicle away from the second protective field of the priority vehicle.

Example 24 includes the method of example 23, including or excluding optional features. In this example, the notice of the priority vehicle is broadcast by a third party.

Example 25 includes the method of any one of examples 23 to 24, including or excluding optional features. In this example, the notice of the priority vehicle is provided by a drone.

Example 26 includes the method of any one of examples 23 to 25, including or excluding optional features. In this example, instructions for generating the priority lane are provided by indicator lights of the current vehicle.

Example 27 includes the method of any one of examples 23 to 26, including or excluding optional features. In this example, a reactive collision avoidance controller is to determine and track all possible sources of collision and to avoid the sources of collision in the first protective field and the second protective field.

Example 28 includes the method of any one of examples 23 to 27, including or excluding optional features. In this example, the first protective field is based, at least partially, on a speed and velocity of the current vehicle.

Example 29 includes the method of any one of examples 23 to 28, including or excluding optional features. In this example, the first protective field is based, at least partially, on a speed and velocity of a plurality of other vehicles.

Example 30 includes the method of any one of examples 23 to 29, including or excluding optional features. In this example, the first protective field is based, at least partially, on a position and velocity of the priority vehicle.

Example 31 includes the method of any one of examples 23 to 30, including or excluding optional features. In this example, a rescue lane controller determines the location of the priority lane based on the current steering and acceleration values.

Example 32 includes the method of any one of examples 23 to 31, including or excluding optional features. In this example, the notice of the priority vehicle is obtained from a remote database.

Example 33 includes the method of any one of examples 23 to 32, including or excluding optional features. In this example, the priority lane is a section of a roadway that is cleared to accommodate efficient access to locations where assistance is requested.

Example 34 is at least one non-transitory machine readable medium having instructions stored therein that. The computer-readable medium includes instructions that direct the processor to obtain a notice of a priority vehicle; generate a first protective field around a current vehicle and a second protective field around the priority vehicle; create a priority lane by moving the first protective field of the current vehicle away from the second protective field of the priority vehicle.

Example 35 includes the computer-readable medium of example 34, including or excluding optional features. In this example, the notice of the priority vehicle is broadcast by a third party.

Example 36 includes the computer-readable medium of any one of examples 34 to 35, including or excluding optional features. In this example, the notice of the priority vehicle is provided by a drone.

Example 37 includes the computer-readable medium of any one of examples 34 to 36, including or excluding optional features. In this example, instructions for generating the priority lane are provided by indicator lights of the current vehicle.

Example 38 includes the computer-readable medium of any one of examples 34 to 37, including or excluding optional features. In this example, a reactive collision avoidance controller is to determine and track all possible sources of collision and to avoid the sources of collision in the first protective field and the second protective field.

Example 39 includes the computer-readable medium of any one of examples 34 to 38, including or excluding optional features. In this example, the first protective field is based, at least partially, on a speed and velocity of the current vehicle.

Example 40 includes the computer-readable medium of any one of examples 34 to 39, including or excluding optional features. In this example, the first protective field is based, at least partially, on a speed and velocity of a plurality of other vehicles.

Example 41 includes the computer-readable medium of any one of examples 34 to 40, including or excluding optional features. In this example, the first protective field is based, at least partially, on a position and velocity of the priority vehicle.

Example 42 includes the computer-readable medium of any one of examples 34 to 41, including or excluding optional features. In this example, a rescue lane controller determines the location of the priority lane based on the current steering and acceleration values.

Example 43 includes the computer-readable medium of any one of examples 34 to 42, including or excluding optional features. In this example, the notice of the priority vehicle is obtained from a remote database.

Example 44 includes the computer-readable medium of any one of examples 34 to 43, including or excluding optional features. In this example, the priority lane is a section of a roadway that is cleared to accommodate efficient access to locations where assistance is requested.

Example 45 is an apparatus. The apparatus includes instructions that direct the processor to an emergency message receiver to obtain notice of a priority vehicle; a means to generate a first protective field around a current vehicle and a second protective field around the priority vehicle; and a means to enable a priority lane by moving the first protective field of the current vehicle away from the second protective field of the priority vehicle.

Example 46 includes the apparatus of example 45, including or excluding optional features. In this example, the notice of the priority vehicle is broadcast by a third party.

Example 47 includes the apparatus of any one of examples 45 to 46, including or excluding optional features. In this example, the means to generate the first protective field and the second protective field is to determine and track all possible sources of collision and to avoid the sources of collision in the first protective field and the second protective field.

Example 48 includes the apparatus of any one of examples 45 to 47, including or excluding optional features. In this example, the first protective field is based, at least partially, on a speed and velocity of the current vehicle.

Example 49 includes the apparatus of any one of examples 45 to 48, including or excluding optional features. In this example, the first protective field is based, at least partially, on a speed and velocity of a plurality of other vehicles.

Example 50 includes the apparatus of any one of examples 45 to 49, including or excluding optional features. In this example, the first protective field is based, at least partially, on a position and velocity of the priority vehicle.

Example 51 includes the apparatus of any one of examples 45 to 50, including or excluding optional features. In this example, the means to enable a priority lane determines the location of a priority lane based on the current steering and acceleration values.

Example 52 includes the apparatus of any one of examples 45 to 51, including or excluding optional features. In this example, the notice of the priority vehicle is obtained from a remote database.

Example 53 includes the apparatus of any one of examples 45 to 52, including or excluding optional features. In this example, the priority lane is a section of a roadway that is cleared to accommodate efficient access to locations where assistance is requested.

Example 54 includes the apparatus of any one of examples 45 to 53, including or excluding optional features. In this example, the priority lane is created autonomously.

Reference in the specification to "one embodiment" or "an embodiment" or "some embodiments" of the disclosed subject matter means that a particular feature, structure, or characteristic described in connection with the embodiment is included in at least one embodiment of the disclosed subject matter. Thus, the phrase "in one embodiment" or "in some embodiments" may appear in various places throughout the specification, but the phrase may not necessarily refer to the same embodiment or embodiments.

Although an example embodiment of the disclosed subject matter is described with reference to the drawings, persons of ordinary skill in the art will readily appreciate that many other ways of implementing the disclosed subject matter may alternatively be used. For example, the order of execution of the blocks in flow diagrams may be changed, and/or some of the blocks in block/flow diagrams described may be changed, eliminated, or combined. Additionally, some of the circuit and/or block elements may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter. For example, in each illustrated embodiment and each described embodiment, it is to be understood that the diagrams of the figures and the description herein is not intended to indicate that the illustrated or described devices include all of the components shown in a particular figure or described in reference to a particular figure. In addition, each element may be implemented with logic, wherein the logic, as referred to herein, can include any suitable hardware (e.g., a processor, among others), software (e.g., an application, among others), firmware, or any suitable combination of hardware, software, and firmware, for example.

What is claimed is:

1. A system, comprising:
a memory that is to store instructions; and
a processor communicatively coupled to the memory, wherein when the processor is to execute the instructions, the processor is to:
obtain notice of a priority vehicle;
generate a first protective field around a current vehicle and identify a second protective field around the priority vehicle, wherein a protective field is an identified region of space around the current vehicle where the first protective field is based on a calculation made from a measurement by a sensor on the current vehicle of at least one of a position of the current vehicle relative to the priority vehicle and a velocity of the current vehicle relative to the priority vehicle; and
create a priority lane by moving the first protective field of the current vehicle away from the second protective field of the priority vehicle by adjusting at least one of a direction a wheel on the current vehicle is steered and an acceleration provided by a motor of the current vehicle.

2. The system of claim 1, wherein the notice of the priority vehicle is received on an emergency message receiver as a priority vehicle position and a priority vehicle speed.

3. The system of claim 1, wherein the notice of the priority vehicle is received by an audio sensor of the current vehicle.

4. The system of claim 1, wherein instructions for generating the priority lane are executed by the processor, the processor to provide, by at least one indicator light of the current vehicle, illumination within the current vehicle indicating a direction to drive to a driver of the current vehicle.

5. The system of claim 1, wherein a reactive collision avoidance controller is to determine and track a plurality of sources of collision and to avoid the plurality of sources of collision in the first protective field and the second protective field.

6. The system of claim 1, wherein the first protective field is based, at least partially, on a speed and velocity of the current vehicle.

7. The system of claim 1, wherein the first protective field is based, at least partially, on a speed and velocity of a plurality of other vehicles.

8. The system of claim 1, wherein the first protective field is based, at least partially, on a position and velocity of the priority vehicle.

9. The system of claim 1, wherein a rescue lane controller determines a location of the priority lane based on a current vehicle steering value and a current vehicle acceleration value.

10. The system of claim 1, wherein the notice of the priority vehicle is obtained from a remote database.

11. The system of claim 1, wherein the priority lane is a section of a roadway that is cleared to accommodate efficient access to locations where assistance is requested.

12. The system of claim 1, wherein the priority lane is created autonomously.

13. An apparatus, comprising:
an emergency message receiver to obtain notice of a priority vehicle;
a reactive collision avoidance controller to generate a first protective field around a current vehicle and to identify a second protective field around the priority vehicle, wherein a protective field is an identified region of space around the current vehicle where the first protective field is based on a calculation made from a measurement by a sensor on the current vehicle of at least one of a position of the current vehicle relative to the priority vehicle and a velocity of the current vehicle relative to the priority vehicle; and a rescue lane controller to enable a priority lane by moving the first protective field of the current vehicle away from the second protective field of the priority vehicle by adjusting at least one of a direction a wheel on the current vehicle is steered and an acceleration provided by a motor of the current vehicle.

14. The apparatus of claim 13, wherein the notice of the priority vehicle is received on the emergency message receiver as a priority vehicle position and a priority vehicle speed.

15. The apparatus of claim 13, wherein the reactive collision avoidance controller is to determine and track a plurality of sources of collision and to avoid the plurality of sources of collision in the first protective field and the second protective field.

16. The apparatus of claim 13, wherein the first protective field is based, at least partially, on a speed and velocity of the current vehicle.

17. The apparatus of claim 13, wherein the first protective field is based, at least partially, on a speed and velocity of a plurality of other vehicles.

18. The apparatus of claim 13, wherein the first protective field is based, at least partially, on a position and velocity of the priority vehicle.

19. The apparatus of claim 13, wherein the rescue lane controller determines a location of the priority lane based on a current vehicle steering value and a current vehicle acceleration value.

20. The apparatus of claim 13, wherein the notice of the priority vehicle is obtained from a remote database.

21. A method, comprising:

obtaining notice of a priority vehicle;

generating a first protective field around a current vehicle and a second protective field around the priority vehicle, wherein a protective field is an identified region of space around the current vehicle where the first protective field is based on a calculation made from a measurement by a sensor on the current vehicle of at least one of a position of the current vehicle relative to the priority vehicle and a velocity of the current vehicle relative to the priority vehicle; and creating a priority lane by moving the first protective field of the current vehicle away from the second protective field of the priority vehicle by adjusting at least one of a direction a wheel on the current vehicle is steered and an acceleration provided by a motor of the current vehicle.

22. The method of claim 21, wherein the notice of the priority vehicle is received on an emergency message receiver as a priority vehicle position and a priority vehicle speed.

23. The method of claim 21, wherein the notice of the priority vehicle is received by an audio sensor of the current vehicle.

24. The method of claim 21, wherein instructions for generating the priority lane are executed by a processor, the processor to provide, by at least one indicator light of the current vehicle, illumination within the current vehicle indicating a direction to drive to a driver of the current vehicle.

25. The method of claim 21, wherein a reactive collision avoidance controller is to determine and track a plurality of sources of collision and to avoid the plurality of sources of collision in the first protective field and the second protective field.

* * * * *